US010919354B2

(12) United States Patent
Stuart et al.

(10) Patent No.: US 10,919,354 B2
(45) Date of Patent: Feb. 16, 2021

(54) TANDEM SUSPENSION SYSTEM

(71) Applicant: Reyco Granning, LLC, Mount Vernon, MO (US)

(72) Inventors: John Stuart, Springfield, MO (US); Rajakumar Subbarayalu, Lafayette, IN (US); John Hinz, Monticello, IN (US)

(73) Assignee: REYCO GRANNING, LLC, Mount Vernon, MO (US)

( * ) Notice: Subject to any disclaimer, the term of this patent is extended or adjusted under 35 U.S.C. 154(b) by 240 days.

(21) Appl. No.: 15/925,256

(22) Filed: Mar. 19, 2018

(65) Prior Publication Data

US 2018/0264903 A1 Sep. 20, 2018
US 2020/0247203 A2 Aug. 6, 2020

Related U.S. Application Data

(60) Provisional application No. 62/473,884, filed on Mar. 20, 2017.

(51) Int. Cl.
*B60G 5/053* (2006.01)
*B60G 5/06* (2006.01)
*B60G 5/047* (2006.01)

(52) U.S. Cl.
CPC ............ *B60G 5/053* (2013.01); *B60G 5/047* (2013.01); *B60G 5/065* (2013.01)

(58) Field of Classification Search
CPC ........ B60G 5/053; B60G 5/065; B60G 5/047; B60G 2204/121; B60G 2200/343; B60G 2202/12; B60G 11/107
See application file for complete search history.

(56) References Cited

U.S. PATENT DOCUMENTS

| 1,673,467 | A | * | 6/1928 | Maurer | B60G 5/053 |
| | | | | | 180/24.13 |
| 1,705,137 | A | * | 3/1929 | Rayburn | B60G 5/047 |
| | | | | | 280/680 |
| 1,866,637 | A | * | 7/1932 | Fageol | B60G 5/053 |
| | | | | | 180/24.01 |
| 2,299,392 | A | | 11/1940 | Johnson et al. | |
| 2,843,395 | A | * | 7/1958 | Brumbaugh | B60G 11/113 |
| | | | | | 280/680 |
| 3,948,334 | A | * | 4/1976 | Danielson | B60G 5/053 |
| | | | | | 180/24.13 |
| 4,061,364 | A | | 12/1977 | Parks | |
| 4,184,698 | A | | 1/1980 | Raidel | |
| 4,699,399 | A | | 10/1987 | Jable | |
| 5,119,543 | A | | 6/1992 | Reilly | |
| 5,228,665 | A | | 7/1993 | Berghus et al. | |
| 5,636,857 | A | | 6/1997 | Tandy et al. | |

(Continued)

FOREIGN PATENT DOCUMENTS

JP 57124141 S 8/1982

*Primary Examiner* — Frank B Vanaman
(74) *Attorney, Agent, or Firm* — Greer, Burns & Crain, Ltd.

(57) ABSTRACT

A tandem suspension system. At least two parallel axles are connected via two eyeleted leaf springs. The eyeleted leaf springs have ends that terminate in eyelets. Each eyelet receives a bushing and adjustable pin. A bracket secures the axles to the eyeleted leaf springs. The eyeleted leaf springs are camelback leaf springs, planar leaf springs or bent leaf springs. Additional leaf springs are also provided.

18 Claims, 17 Drawing Sheets

(56) References Cited

U.S. PATENT DOCUMENTS

| | | |
|---|---|---|
| 5,988,614 A | 11/1999 | Sturmon |
| 6,206,407 B1 | 3/2001 | Fuchs et al. |
| 6,264,231 B1 | 7/2001 | Scully |
| 6,460,872 B2 | 10/2002 | Cadden |
| 7,597,310 B2 | 10/2009 | Solomon |
| 7,926,836 B2 | 4/2011 | Noble et al. |
| 8,540,263 B2 | 9/2013 | Pizzeta |
| 8,590,912 B2 | 11/2013 | McCarthy et al. |
| 8,979,105 B2 | 3/2015 | McCarthy |
| 9,073,401 B2 | 7/2015 | LeMerise et al. |
| 2003/0122293 A1 | 7/2003 | Akhtar et al. |
| 2011/0127753 A1 | 6/2011 | Griffin |
| 2013/0069333 A1 | 3/2013 | Pizzeta |

\* cited by examiner

TANDEM SUSPENSION SYSTEM

RELATED APPLICATIONS

This application claims priority to U.S. Provisional Patent Application No. 62/473,884, filed on Mar. 20, 2017, the entirety of which is incorporated herein by reference.

BACKGROUND

This disclosure relates generally to a suspension system for heavy vehicles, and more particularly to a dual drive axle, or tandem, suspension system.

Many commercial vehicles have a pair of parallel drive axles. The suspension systems for the dual drive axles are often referred to as a tandem suspension. One such tandem suspension that is used in off-road or other severe service applications is a walking beam suspension.

In a walking beam suspension, the two drive axles are connected via parallel walking beams. The walking beams, which are mounted to the vehicle frame, include a pivot at the center. The connection between the axles allows the axles to articulate over objects with increased tire contact and traction. Additionally, the movement of the axles over objects equalizes the weight distribution of the load between the two drive axles.

Another conventional tandem suspension system, often referred to as a six-rod suspension, replaces the walking beam with a complaint spring member (like a leaf spring). Compared to the walking beam suspension, the six-rod suspension provides an improved ride. However, conventional six-rod suspension systems do not include a pivotable connection between the spring members and the axles. Thus, these systems require various longitudinal rods. These rods increase the weight, cost, and complexity of the suspension system.

Accordingly, there is a need for developing an improved tandem suspension system that addresses one or more of the above-identified drawbacks.

SUMMARY

The above-mentioned need is met or exceeded by the present tandem suspension system described herein. Specifically, the present tandem suspension system utilizes brackets with a pivot-able compliant walking beam. The compliant walking beam architecture is superior to an industry standard walking beam in that it improves ride quality. Other configurations have attempted to improve ride quality by adding compliant members (leaf springs or rubber springs) in series with the beam. Additionally, in the present tandem suspension system bushings are installed into eyeleted leaf springs that form the compliant walking beam. The present tandem suspension system is believed to be superior to 6-rod architecture in that a 6-rod requires four additional longitudinal rods—and such rods are not required in the present tandem suspension system.

An important aspect of the present tandem suspension is that eyeletted leaf springs connect the ends of the axle assemblies.

Accordingly, in at least one aspect, a tandem suspension system is provided. The tandem suspension system includes at least two axles assemblies disposed parallel to each other. The at least two axle assemblies each including a first end and a second end. The tandem suspension system also includes at least two eyeletted-leaf springs, each eyeletted-leaf spring having a first end and a second end, and at least one the first end and the second end of each eyeletted-leaf springs is curved to form an eyelet. A bushing is disposed in each of the eyelets. A rotatable pin is disposed in each bushing. A bracket is attached to each pin with a fastener having a longitudinal axis transverse to a longitudinal axis of pin. Each bracket is secured proximate to one of the first or second ends of the axles assemblies.

It is contemplated that both the first end and the second end of each eyeletted-leaf spring is curved to form eyelets.

It is also contemplated that two eyeletted-leaf springs are camel back leaf springs.

Alternatively, it is contemplated that the two eyeletted-leaf springs are planar leaf springs.

Furthermore, it is also contemplated that the two eyeletted-leaf springs are bent leaf springs.

It is completed that the tandem suspension system also includes at least one additional leaf spring associated with each of the at least two eyeletted-leaf springs. The additional leaf springs are secured to ends of the two axles assemblies.

In at least one aspect, the tandem suspension system has two axle assemblies and two eyeletted-leaf springs, and both ends of the two eyeletted-leaf springs are curved to form an eyelet. The eyeletted-leaf springs are coupled to a trunnion secured to a frame.

Accordingly, in at least one aspect, a tandem suspension system is provided which includes a frame with two parallel main members and two trunnions with each parallel member coupled to a trunnion. Two eyeletted-leaf springs are provided with each eyeletted-leaf spring coupled to one of the two trunnions, and each eyeletted-leaf spring having a first end and a second end, the first end and the second end of the two eyeletted-leaf springs are curved to form an eyelet. Two axle assemblies are disposed parallel to each other and each axle assembly including a first end and a second end. The first end of a first axle assembly is coupled to the first end of a first eyeletted-leaf spring and the second end of the first axle assembly is coupled to the first end of a second eyeletted-leaf spring. The first end of the second axle assemblies is coupled to the second end of the first eyeletted-leaf spring and the second end of the second axle assembly is coupled to the second end of the second eyeletted-leaf spring.

It is contemplated that each end of the eyeletted-leaf springs is coupled to a bracket and the brackets receive one of the ends of the two axle assemblies. A rotatable pin is disposed in each eyelet and coupled to the bracket. A bushing is disposed within each eyelet between the rotatable pins and the eyeletted-leaf springs.

Again, it is contemplated that eyeletted-leaf springs are camel back leaf springs. Alternatively, the eyeletted-leaf springs are planar leaf springs or bent leaf springs.

It is further contemplated that the system includes two additional leaf springs, each associated with one of two eyeletted-leaf springs. The additional leaf springs are each coupled to one of the trunnions.

It is also contemplated that the system includes a rod extending between and coupled to one of the axle assemblies and the frame. Additionally, the system includes a pair of rods forming a V-shape extending between and coupled to the first axle assembly and the frame.

Additional aspects, embodiments, and details of the present disclosure, all of which may be combinable in any manner, are set forth in the following detailed description of the disclosure.

BRIEF DESCRIPTION OF THE DRAWINGS

One or more exemplary embodiments of the present disclosure will be described below in conjunction with the following drawing figures, in which.

DETAILED DESCRIPTION

Figure 1A:
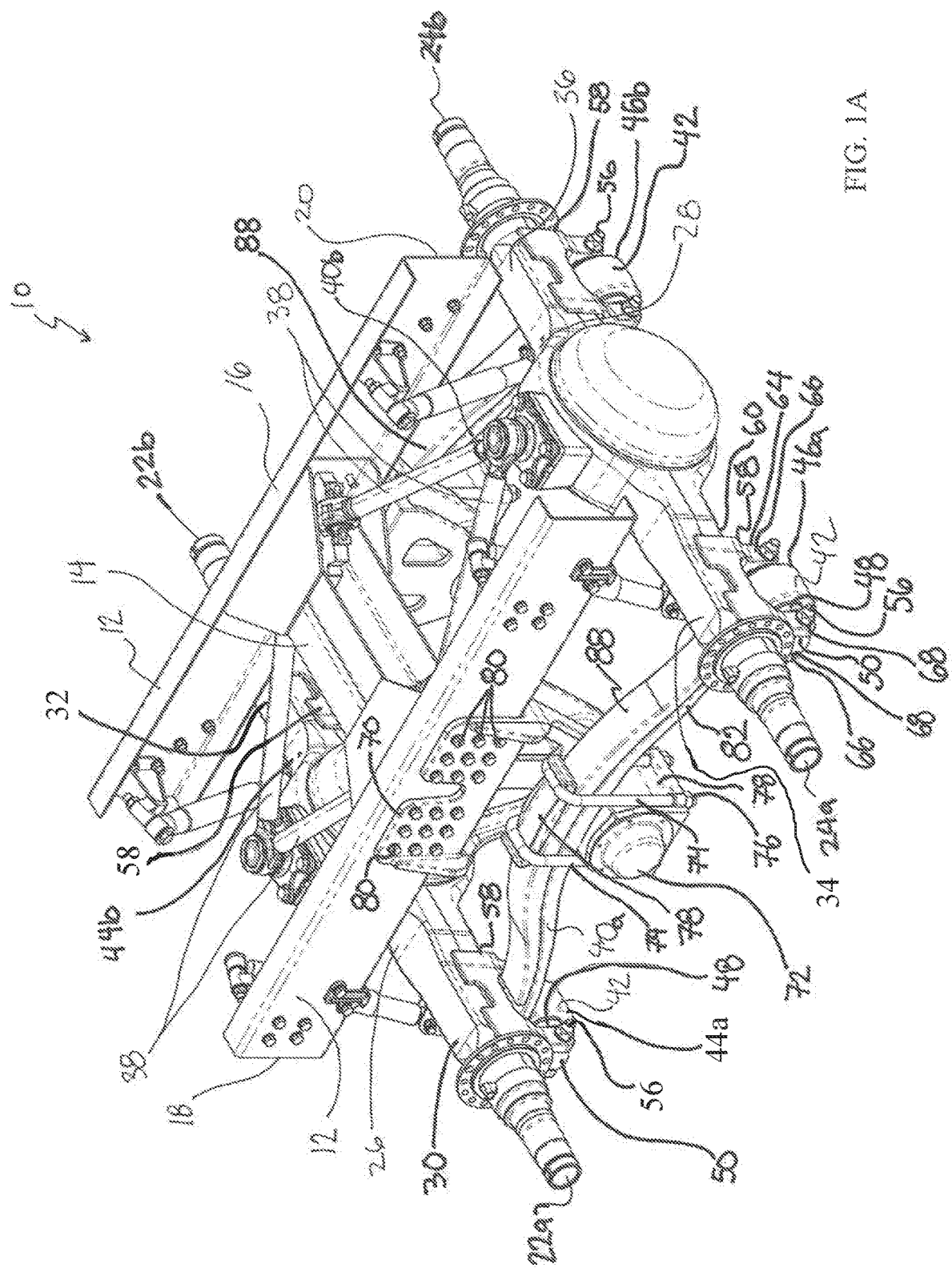
FIG. 1A is a side and rear perspective view of a tandem suspension system according to the present disclosure.

With these general principles in mind, one or more embodiments of the present disclosure will be described with the understanding that the following detailed description is not intended to be limiting.

Referring now generally to the FIGURES, a tandem suspension assembly is generally designated 10 and includes a pair of spaced, parallel main members 12 (sometimes referred to as "sub-frame" members) extending along a longitudinal axis of the assembly, rigidly secured to each other by one or more transverse cross members 14 by welding or other fastening technique well known in the art. Once joined, the main members 12 and the cross members 14 form a frame 16. As is known in the art, the frame 16 has a front end 18 facing a front of the vehicle or trailer (not shown) and an opposite rear end 20. Also, as is common, the tandem suspension assembly 10 provides for at least two pairs of trailer wheel mounting points, as shown a first pair of trailer wheel mounting points 22a, 22b, and a second pair trailer wheel mounting points 24a, 24b. Although not shown, each trailer wheel mounting points 22a, 22b, 24a, 24b typically includes associated brakes, pneumatic springs, and other components well known to those skilled in the art.

As is common with the tandem suspension assembly 10, each pair of trailer wheel mounting points 22a, 22b, 24a, 24b is in rotational communication with an axle contained within an axle assembly 26, 28. More specifically, a first axle assembly 26 includes a first end 30 associated with a first wheel mounting point 22a and a second opposite end 32 associated with a second wheel mounting point 22b. Similarly, a second axle assembly 28 includes a first end 34 associated with a first wheel mounting point 24a and a second opposite end 36 associated with a second wheel mounting point 24b. As is known in the art, for a drive axle, the axle assembly 26, 28 houses a means for transferring rotation from a drive shaft to the axle (not shown). Furthermore, while the present embodiments are described in relation to drive axles, the present disclosure is not intended to be limited thereto.

One or more rods 38 secure each axle assembly 26, 28 to the frame 16. In some embodiments, the rods 38 are V-rods. See, e.g., FIGS. 1A, 2A, 3A, 4A, and 5A. Other rods 38 are contemplated to be utilized, for example longitudinal rods. See, e.g., FIGS. 6A and 7A.

In the various embodiments of the present tandem suspension 10, the axles, within the axle assemblies, are both connected to eyeletted-leaf springs 40a, 40b having eyelets 42. More specifically, the first end 30 of the first axle assembly 26 and the first end 34 of the second axle assembly 28 are associated with opposite ends 44a, 46a of a first leaf spring 40a. Similarly, the second leaf spring 40b is associated in the exact same manner with the second end 32 of the first axle assembly 26 and the second end 36 of the second axle assembly 28. While the second end 44b of the second leaf spring 40b is partially obscured in some views of the FIGURES, one of ordinary skill in the art will appreciate that the depiction of the first leaf spring 40a is applicable to the second leaf spring 40b and that the side elevation views of the FIGURES are mirror images of the depiction of the other sides.

In all of the embodiments, at least one end 44a, 44b, 46a, 46b of the eyeletted-leaf springs 40a, 40b is curved to form the eyelet 42 and, preferably both ends 44a, 44b, 46a, 46b of each of the eyeletted-leaf springs 40a, 40b are curved to form eyelets 42. The ends 44a, 44b, 46a, 46b of the eyeletted-leaf springs 40a, 40b preferably curve downward, i.e., around and towards a bottom side of the eyeletted-leaf springs 40 to form the eyelets 42. Other configurations are contemplated. For example, the ends 44a, 44b, 46a, 46b of the eyeletted-leaf springs 40a, 40b could curve upward or split open to form the eyelets 42

A bushing 48 is disposed in each eyelet 42. A pin 50 extends through each of the bushings 48 and is configured to rotate in relation to the bushings 48. The pins 50, preferably at each end thereof, include apertures (not shown) configured to receive a fastener 56. As is known, the pins 50 are also configured to receive one or more shims (not shown) to allow for adjustment to align the axles (or axle assemblies 26, 28). Such bushings 48 and pins 50 are known in the art.

Each pin 50 is secured to a bracket 58 via, for example, the fasteners 56. The brackets 58 includes an upper portion 60 forming a U-shaped channel. The U-shaped channel is sized and configured to be associated with an end 30, 32, 34, 36 of the one of the axle assemblies 26, 28. The brackets 58 also include a lower portion 64 having, at least one, preferably two, clevis portions 66. Arms 68 of each clevis portion 66 receive the fasteners 56 to secure the pins 50 to the bracket 66 so that a longitudinal axis of the fastener 56 is transverse to a longitudinal axis of the pin 50.

Each eyeletted-leaf spring 40a, 40b is mounted to the frame 16 via a hanger bracket 70 and a trunnion 72 supported by the bracket 70. Each eyeletted-leaf spring 40a, 40b is secured to the trunnion 72 with one or more U-bolts 74 and nuts 76 secured to the U-bolts 74. Upper and lower members 78 are used with the U-bolts 74 and nuts 76 to compress and secure the eyeletted-leaf springs 40a, 40b to the trunnions 72. The hanger brackets 70 are secured to the frame 16, proximate the middle between the two axle assemblies 26, 28, via a plurality of fasteners 80.

Figure 4A:
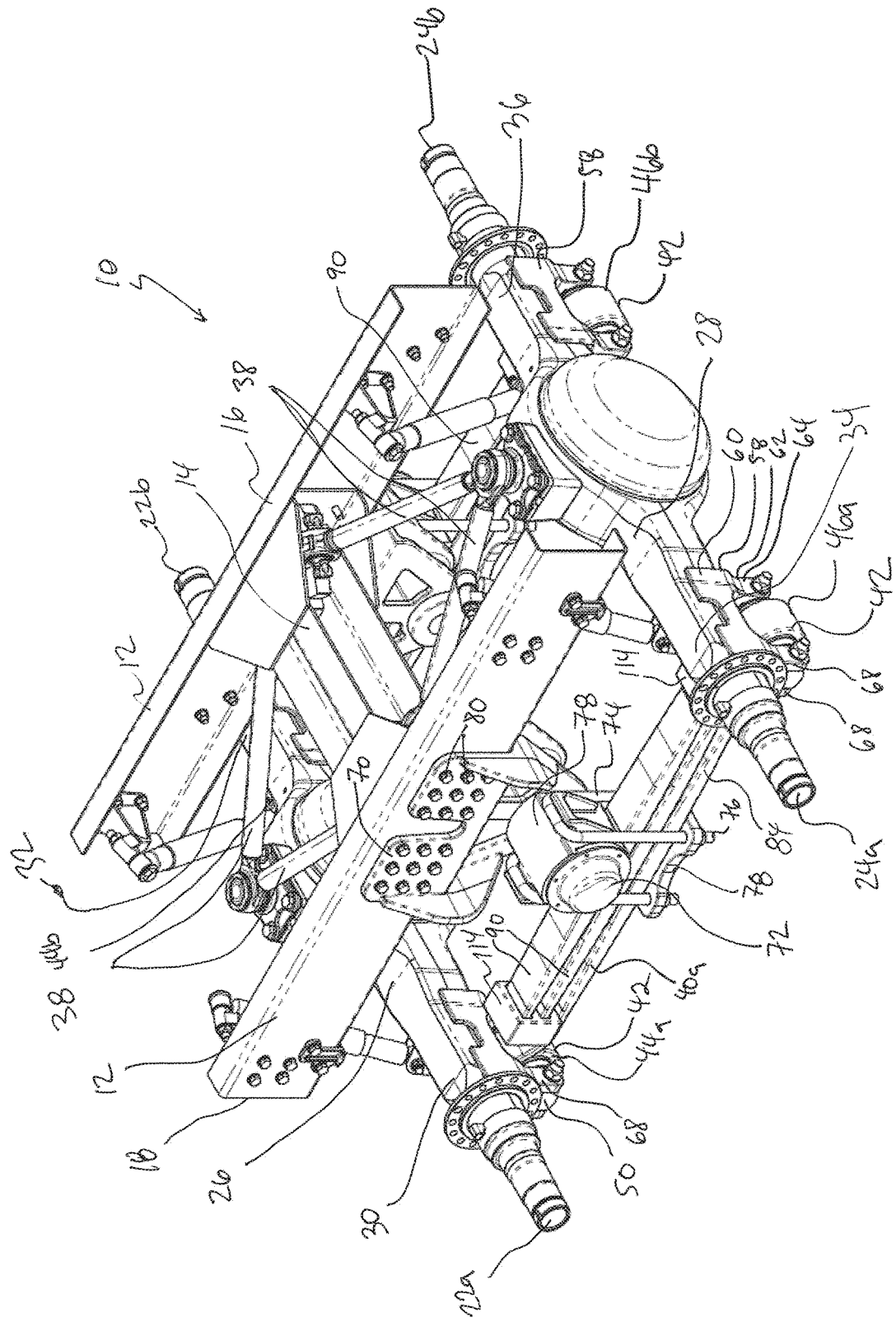
FIG. 4A is a side and rear perspective view of still another tandem suspension system according to the present disclosure.
Figure 4B:
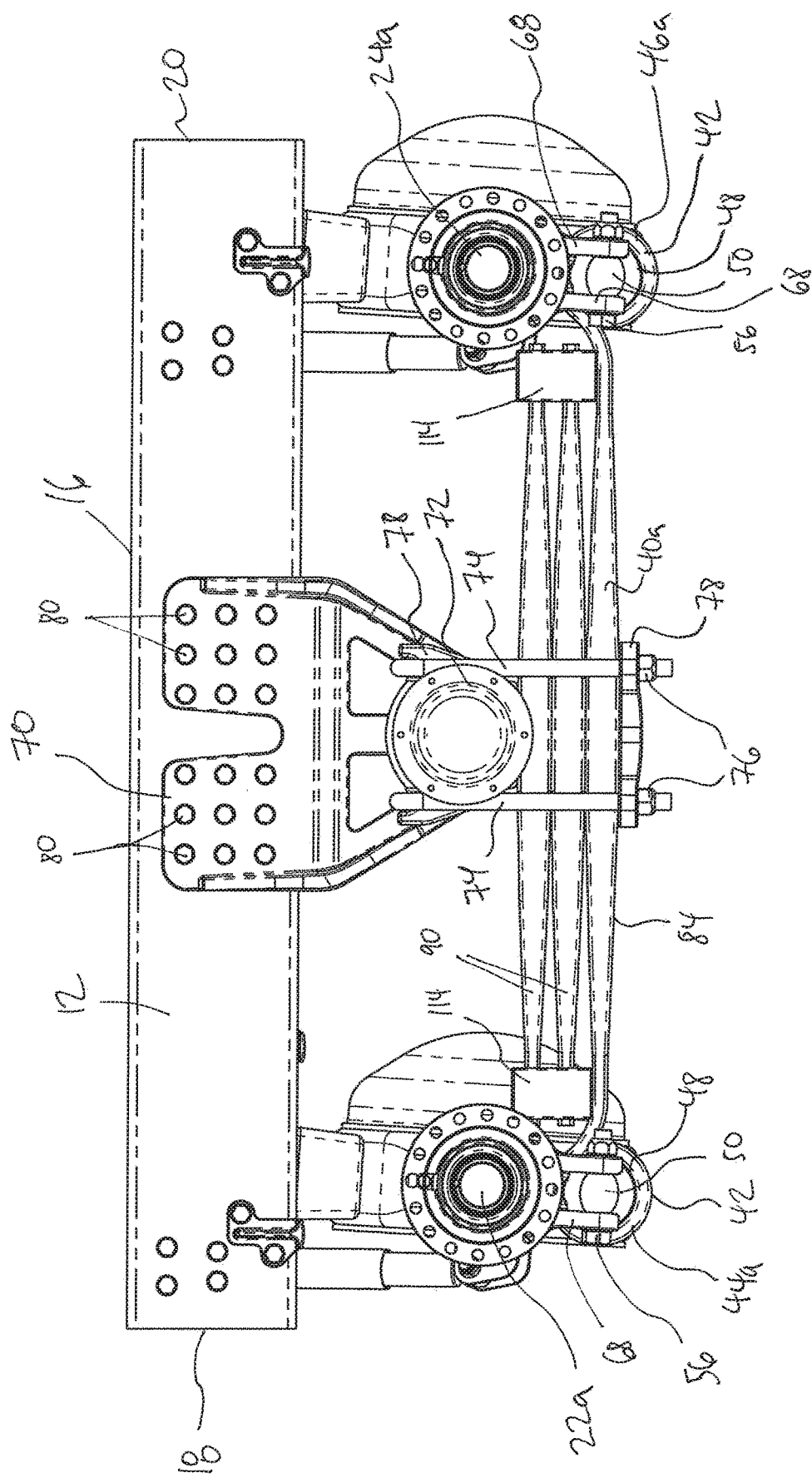
FIG. 4B is a side elevation view of the present tandem suspension system shown in FIG. 4A.
Figure 5A:
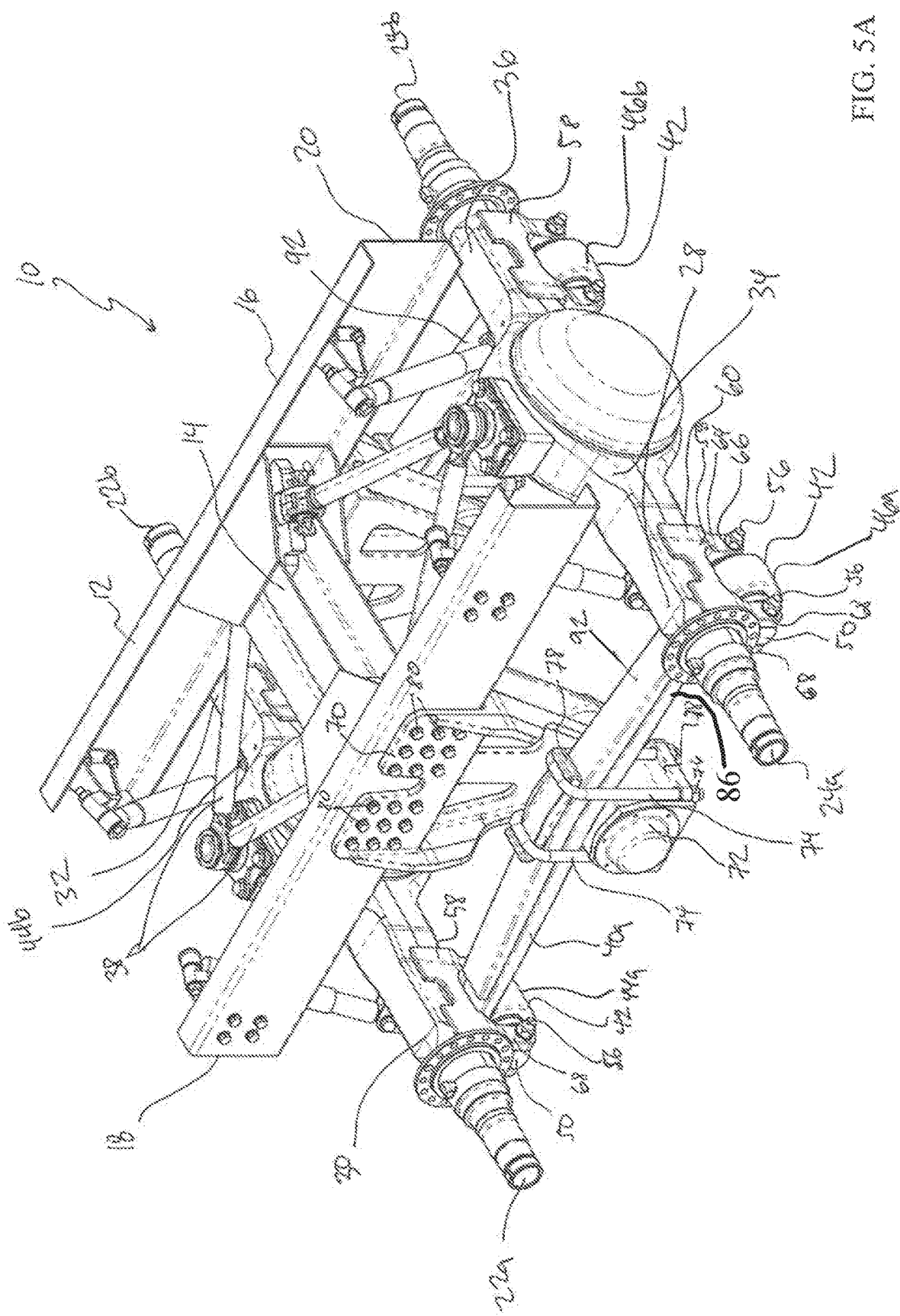
FIG. 5A is a side and rear perspective view of a further tandem suspension system according to the present disclosure.
Figure 5B:
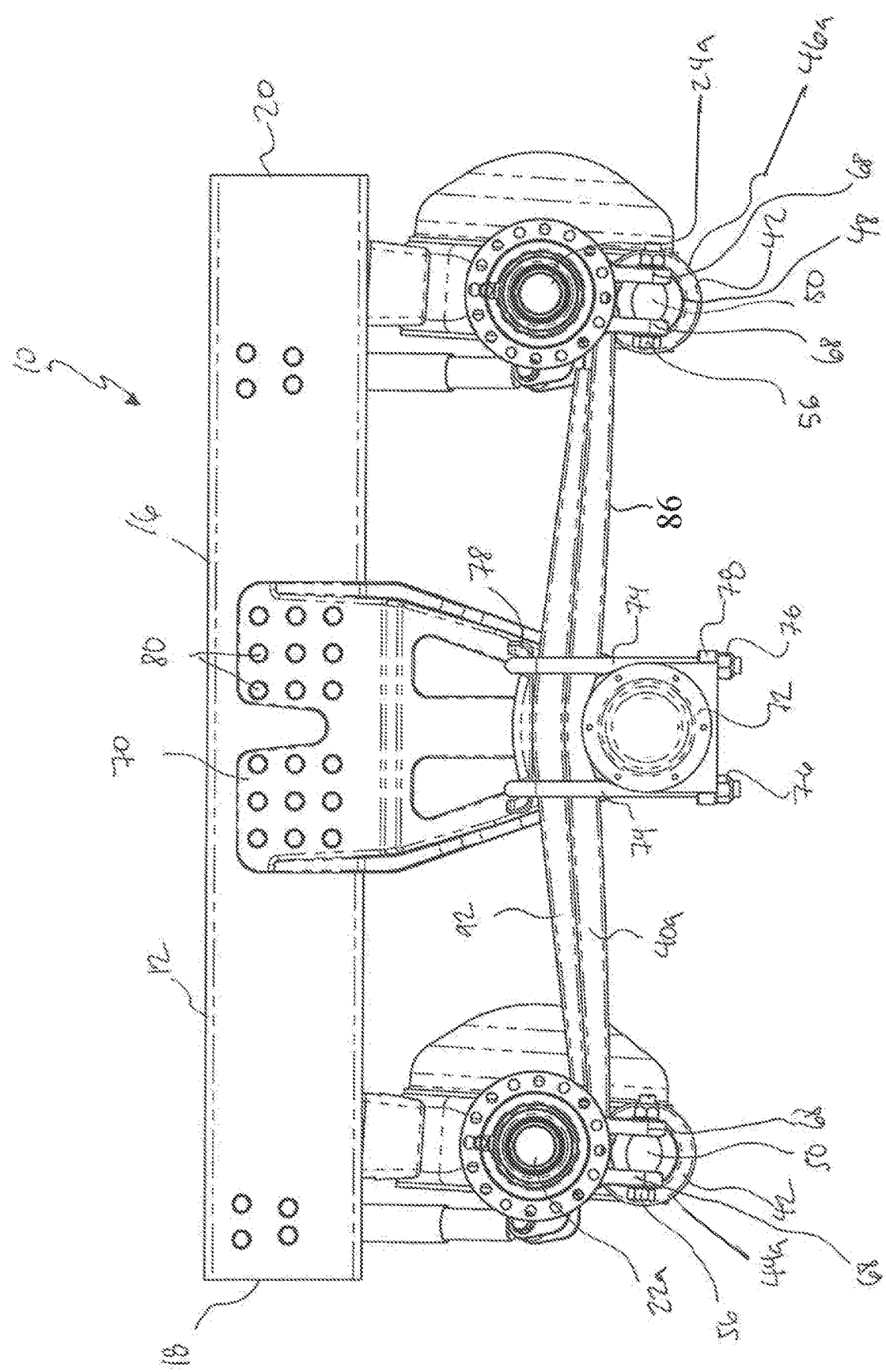
FIG. 5B is a side elevation view of the present tandem suspension system shown in FIG. 5A.

The present tandem suspension assembly system 10 contemplates utilizing eyeletted-leaf springs 40a, 40b that are camelback leaf springs 82 (FIGS. 1A-1B and 2A-2B), planar leaf springs 84 (FIGS. 3A-3B, 4A-4B, 6A-6B, and 7-7B), and bent leaf springs 86 (FIGS. 5A-5B). It is believed that the camelback leaf springs 82 or the bent leaf springs 86 will better accommodate the pinion angle change as the axle travels up and down.

As shown, the camelback leaf springs 82 and the bent leaf springs 86 are secured about the upper surface of the trunnion 72. See, FIGS. 1A-1B, 2A-2B, and 5A-5B. In some embodiments, the eyeletted-leaf springs 40 are secured about the lower surface of the trunnion 72. See, FIGS. 3A-3B and 4A-4B. Additionally, in some embodiments, as discussed below, there are eyeletted leaf springs secured about both the upper and lower surfaces of the trunnion 72. See, FIGS. 6A-6B and 7A-7B.

It is also contemplated that additional leaf springs are provided. In some of the various embodiments, additional leaf springs 88, 90, 92 without eyelets are provided for the tandem suspension assembly system 10. For example, the embodiment in FIGS. 1A and 1B includes an additional leaf spring 88 associated with each of the eyeletted-leaf springs 40a, 40b. The additional leaf spring 88 also is a camelback leaf spring.

Figure 2A:
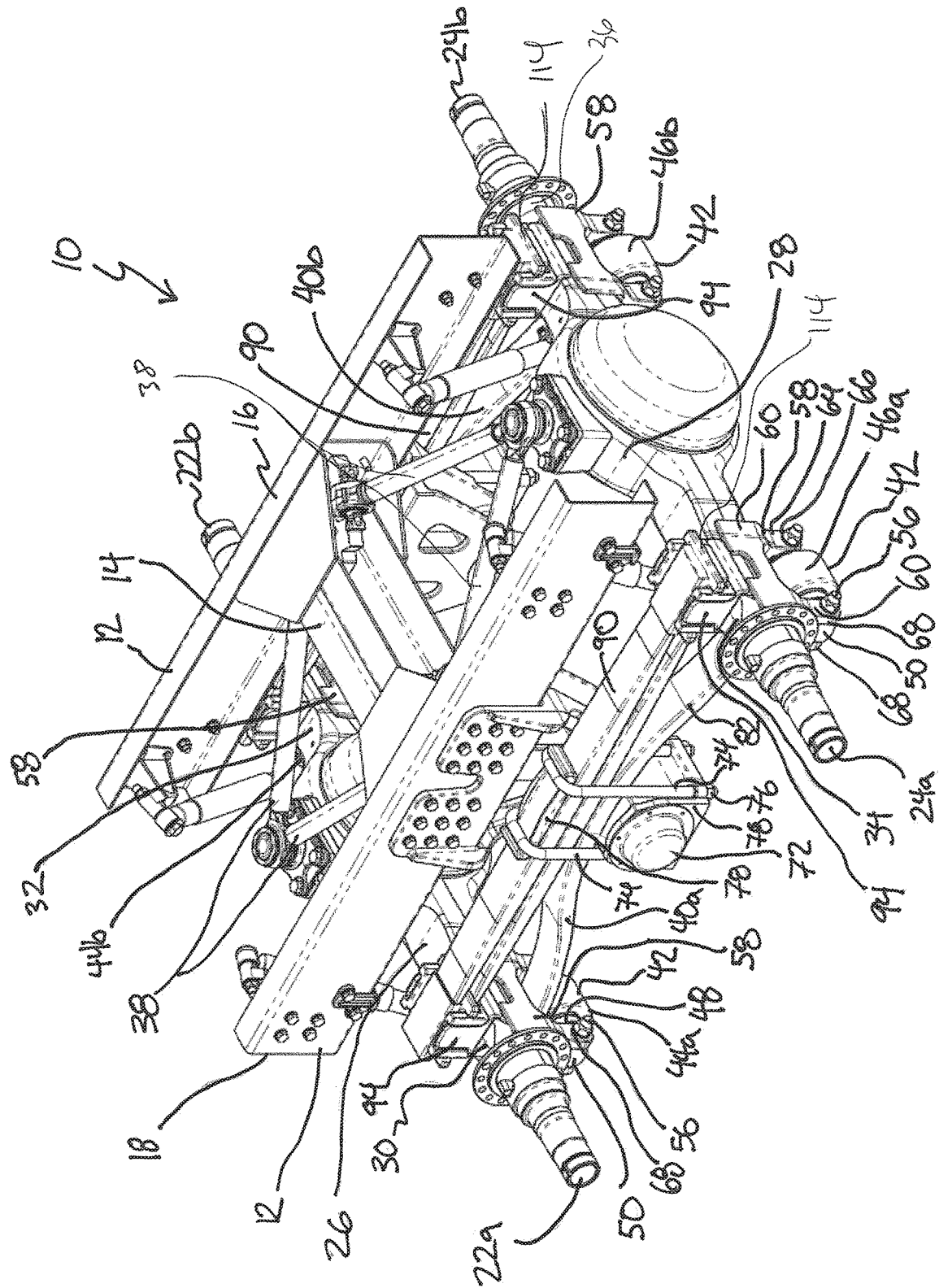
FIG. 2A is a side and rear perspective view of another tandem suspension system according to the present disclosure.
Figure 2B:
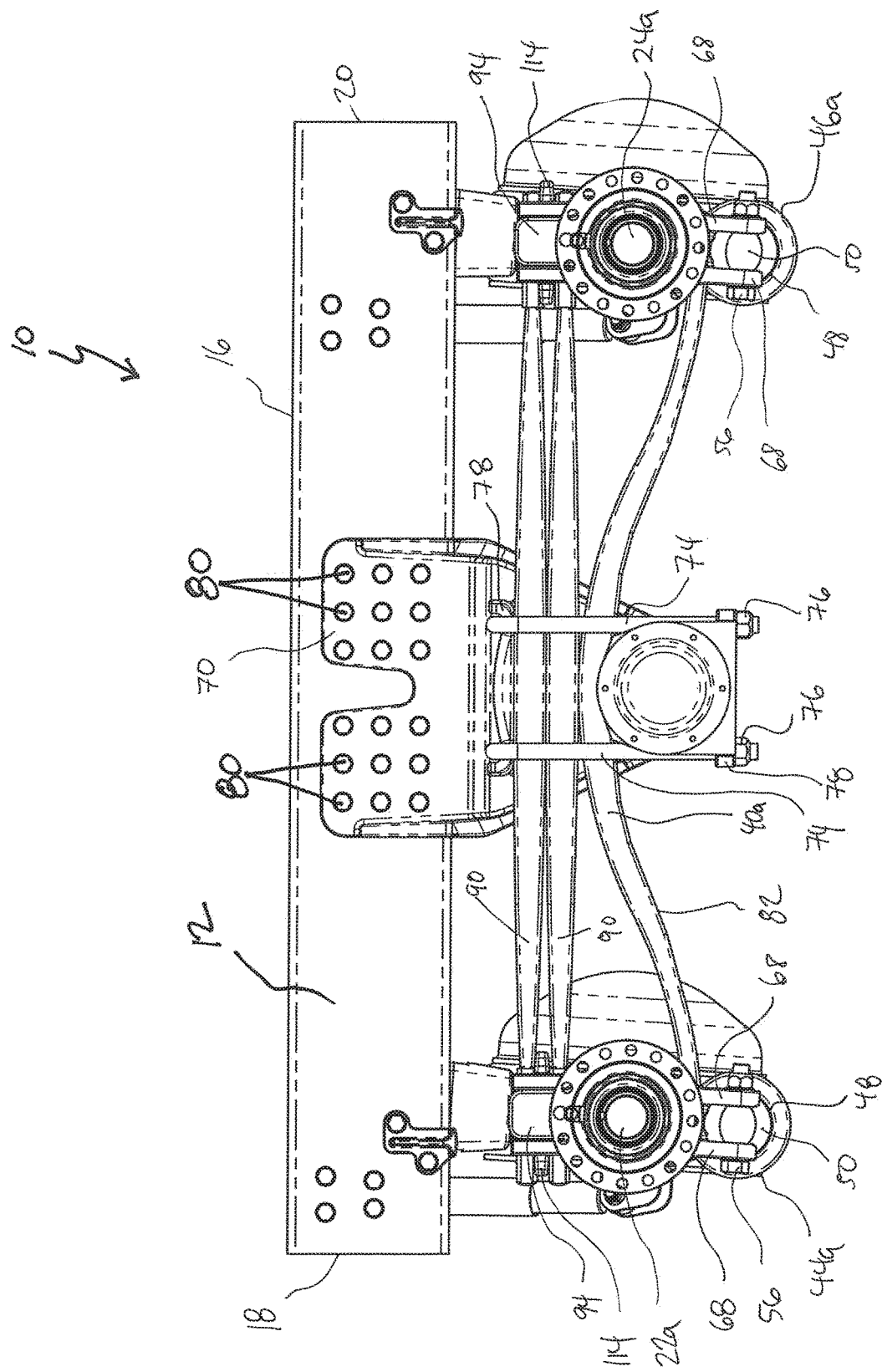
FIG. 2B is a side elevation view of the present tandem suspension system

In the embodiment shown in FIGS. 2A-2B, which also includes eyeletted-leaf springs 40 that are camelback leaf springs 82, additional planar leaf springs 90 are provided. Leaf spring mounts 94 are provided at the ends of the additional planar leaf springs 90 in order to support same.

Turning to FIGS. 8A-8D, the leaf spring mounts 94 include an upper portion 96 having two retaining arms 98, and a lower portion 100 with two securement arms 102. The securement arms 102 are configured to sit on and receive one of the axle assemblies 26, 28, preferably opposite the brackets 58. The retaining arms 98 of the leaf spring mounts 94 receive a channel spacer 104 configured to form a channel 106 to receive the ends of the planar leaf springs 90. The channel spacer 104 includes two extensions 108 extending upwardly from a base 110. The base 110 rests on the upper surface of the leaf spring mount 94. The extensions 108 of the channel spacer 104 have an inner surface that forms the channel 106 and an opposite outer surface with a slot 112 sized to receive one of the retaining arms 98 of the leaf spring mount 94. Additional planar spacers 114 are located between adjacent leaf springs 90. The planar spacer 114 has an I-shaped profile to allow the channel spacer 104 and/or retaining arms 98 to orientate the planar spacer 114.

The depicted leaf spring mounts 94 provide plastic to plastic sliding contact and avoid metal to metal contact. Additionally, these leaf spring mounts 94 provide for easy assembly and removal, as well as replacement. Furthermore, no lubrication or tools are believed necessary for assembling and installing the leaf spring mounts 94.

Referring now to the embodiments shown in FIGS. 3A-3B and 4A-4B, as mentioned above, the eyeletted-leaf springs 40a, 40b are planar leaf springs 84.

Figure 3A:
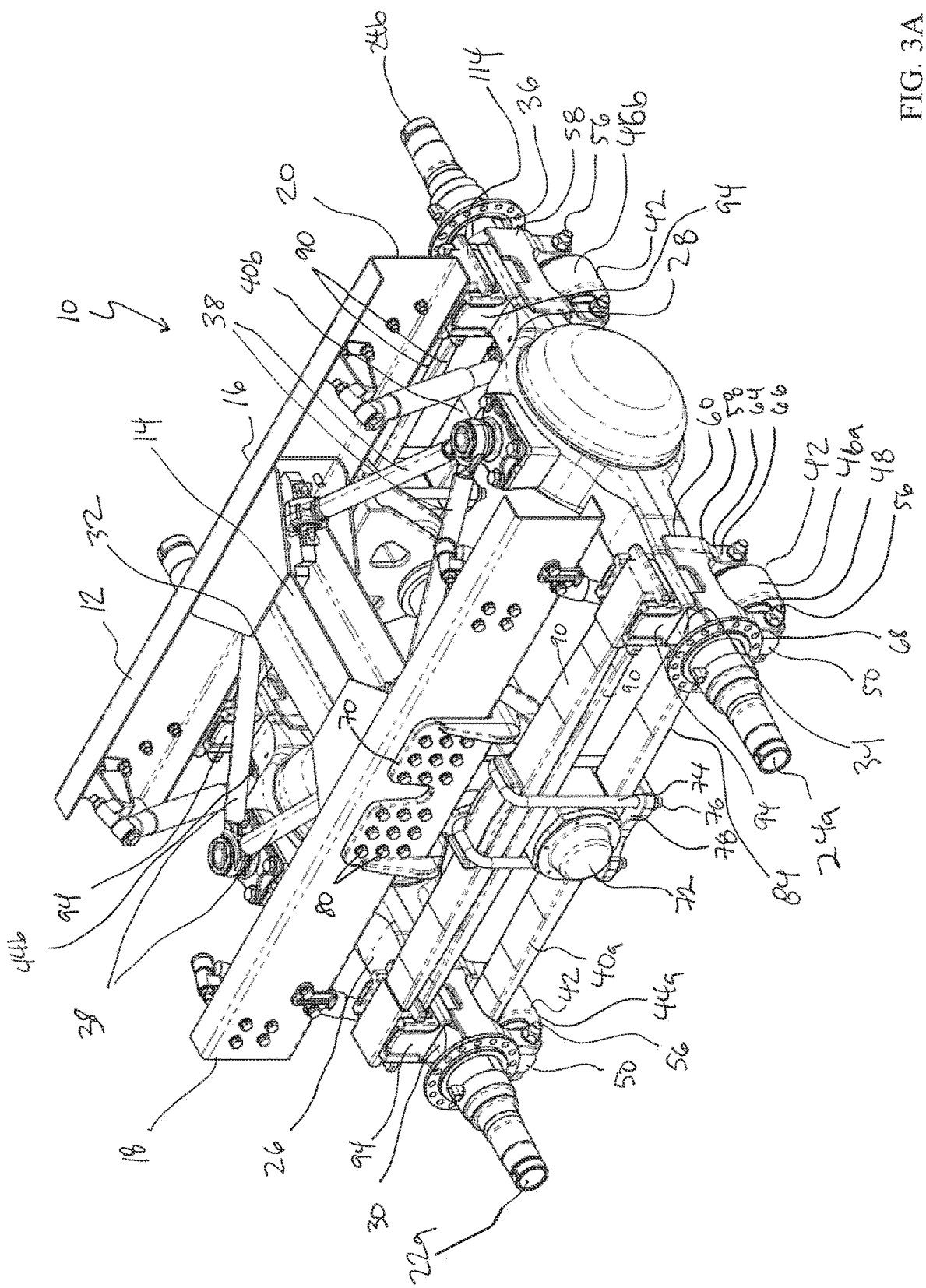
FIG. 3A is a side and rear perspective view of yet another tandem suspension system according to the present disclosure.
Figure 3B:
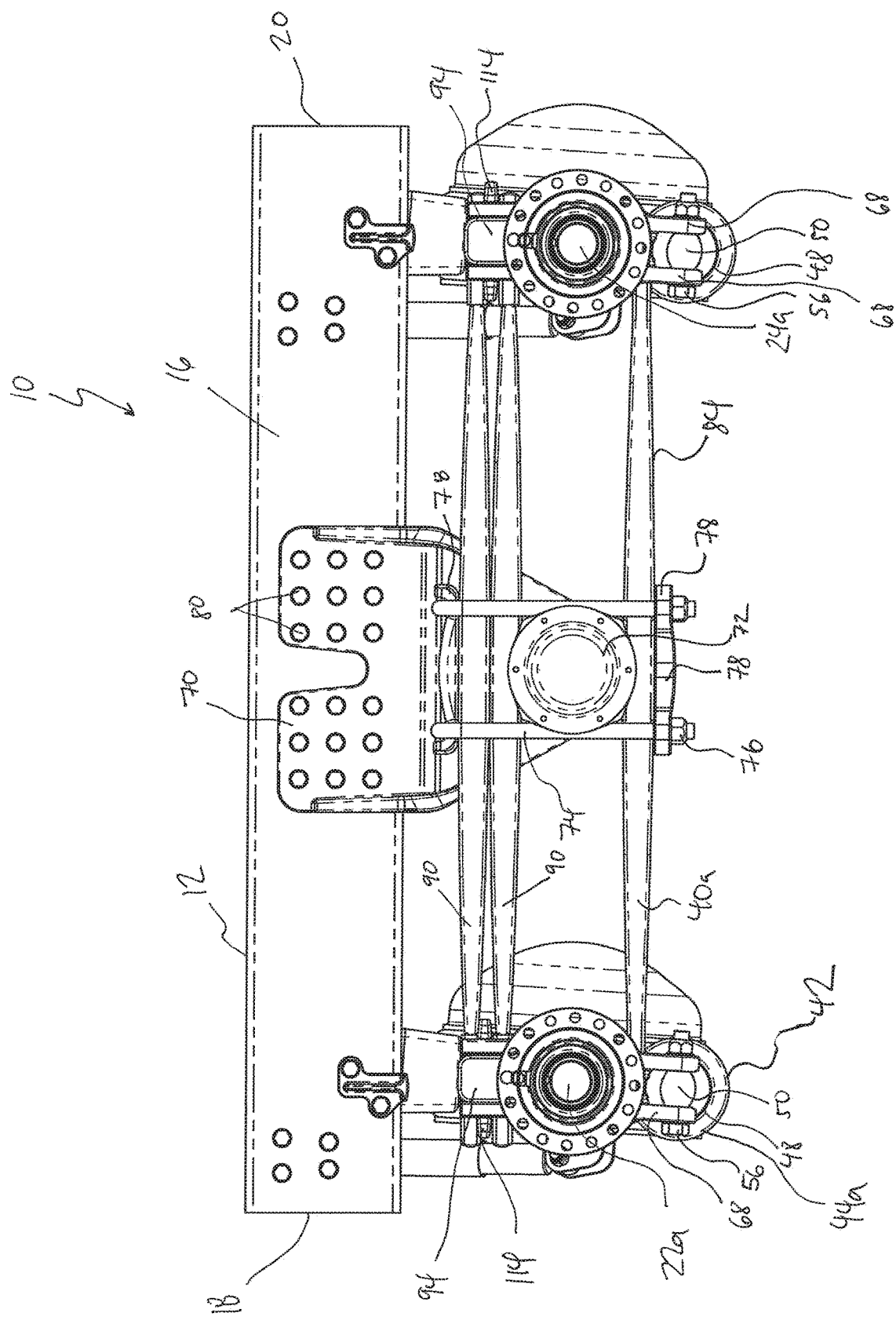
FIG. 3B is a side elevation view of the present tandem suspension system shown in FIG. 3A.

In the embodiment of FIGS. 3A-3B, the eyeletted-leaf springs 40a, 40b are secured about the bottom surface of the trunnion 72, while additional planar leaf springs 90 are secured about the top surface of the trunnion 72. Leaf springs mounts 94, described above with respect to FIGS. 6A-6B, are provided for the ends of the additional planar leaf springs 90.

In the embodiment of FIGS. 4A-4B, the additional planar leaf springs 90 are shorter than the eyeletted-leaf spring 40. Accordingly, leaf spring spacers 114 are disposed on the ends of the additional planar leaf springs 90. The leaf spring spacers 114 are a housing that include slots, or openings for the ends of the additional planar leaf springs 90. The leaf spring spacers 114 sit on the upper surface of the eyeletted-leaf spring 40. The leaf spring spacers 114 are preferably made from, for example, ultra-high molecular weight plastic, graphite filled nylon, or molybdenum disulfide-filled nylon.

In the embodiment of FIGS. 5A-5B, the eyeletted-leaf springs 40a, 40b are bent leaf springs 84. The additional leaf springs 92 are also bent leaf springs. In comparison with the embodiment of FIGS. 1A-1B, the hanger brackets 70 in FIGS. 5A-5B are further away (i.e., lower) from the frame 16.

Turning to FIGS. 6A-6B and 7A-7B, these embodiments include two eyeletted-leaf springs 40 on each side of the tandem suspension assembly 10.

Figure 6A:
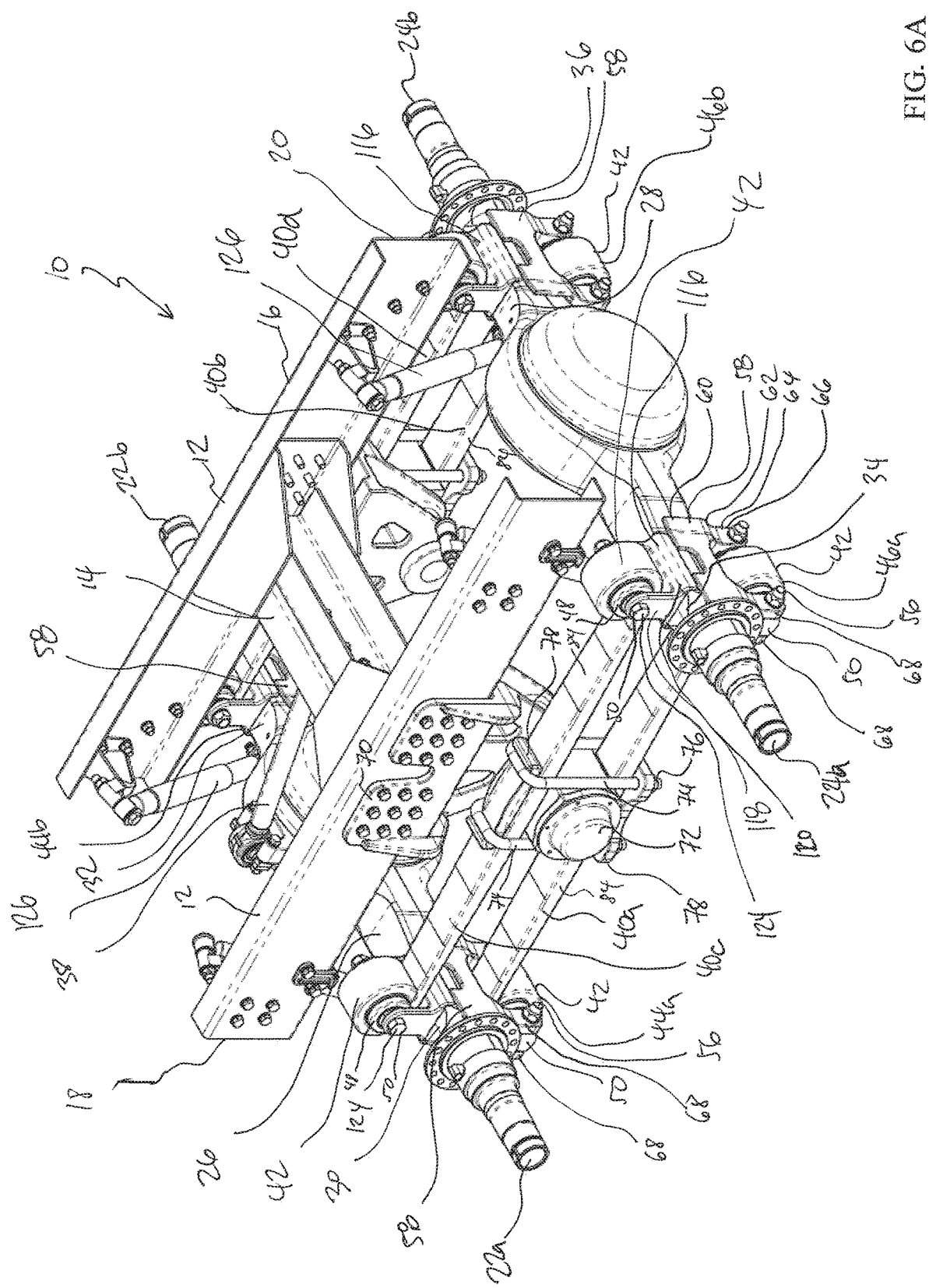
FIG. 6A is a side and rear perspective view of a further tandem suspension system according to the present disclosure.
Figure 6B:
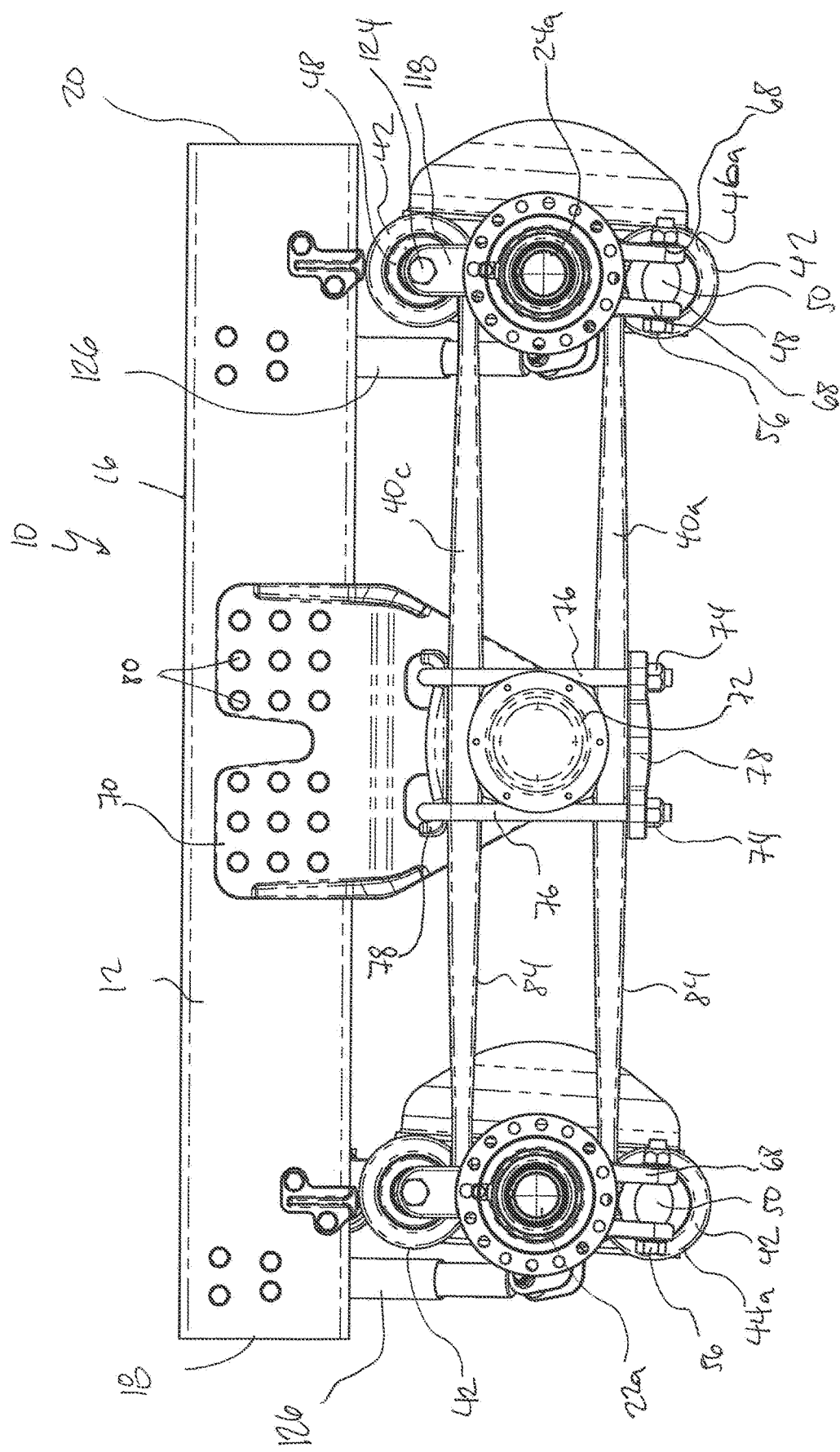
FIG. 6B is a side elevation view of the present tandem suspension system shown in FIG. 6A.

In the tandem suspension assembly 10 shown in FIGS. 6A-6B, each end 30, 32, 34, 36 of the axle assemblies 26, 28 is secured to multiple eyeletted-leaf springs, eyeletted-leaf springs 40a, 40b are secured about the bottom of the trunnion 72 and upper eyeletted-leaf springs 40c, 40d are secured about the top of the trunnion 72. The eyeletted-leaf springs 40a, 40b are secured to the axle assembly 26, 28 in the same manner as the above described embodiments.

The upper eyeletted-leaf springs 40c, 40d are secured to the axle assemblies 26, 28, via brackets 116. The brackets 116 includes two arms 118 that extend upwardly from a base 120. Additionally, securement arms 116 extending downwardly from the base 120 and form a chancel therewith configured to sit on of the axle assemblies 26, 28, preferably opposite the brackets 58. The pins 50 in the bushings 48 of the eyelets 42 of the upper eyeletted-leaf springs 40c, 40d are secured to the upwardly extending arms 118 of base 120. For the upper eyeletted-leaf springs 40c, 40d, the pins 50 may comprise a bolt 124 with a removable nut.

Figure 7A:
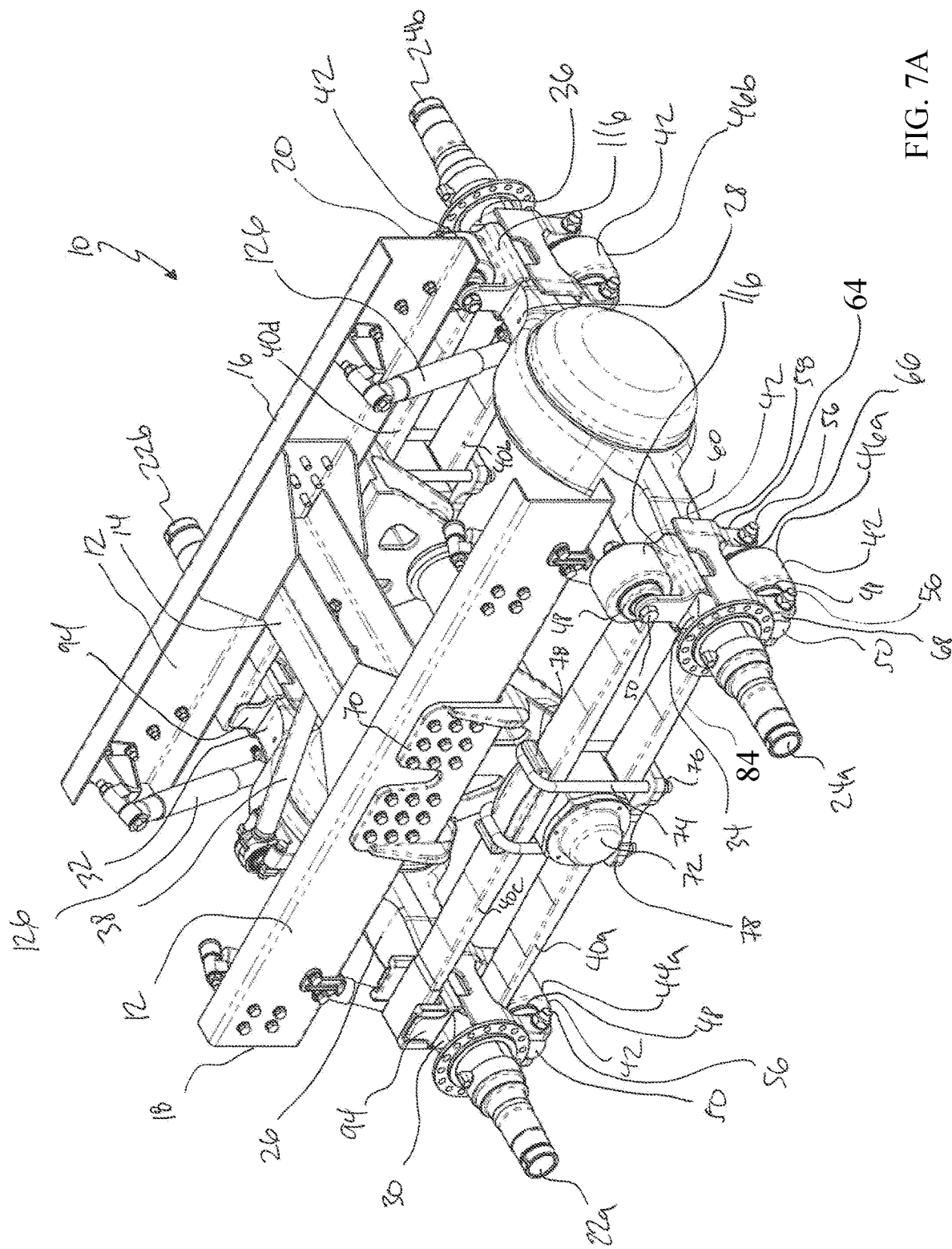
FIG. 7A is a side and rear perspective view of a further tandem suspension system according to the present disclosure.
Figure 7B:
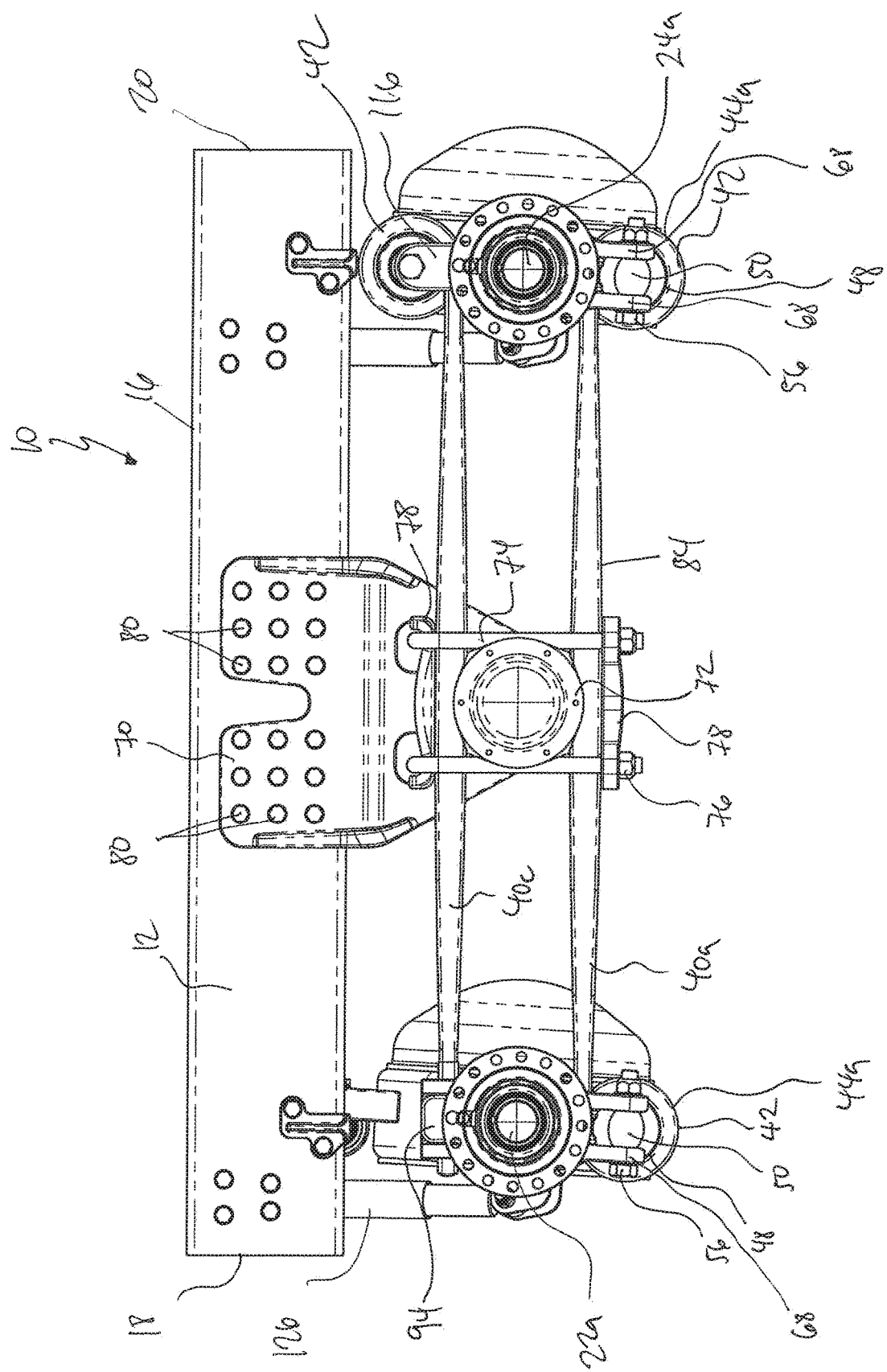
FIG. 7B is a side elevation view of the present tandem suspension system shown in FIG. 7A.
Figure 8B:
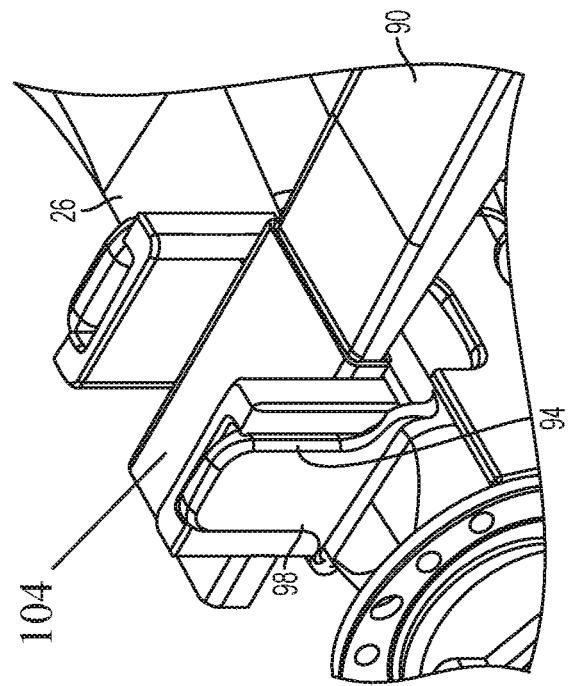
FIG. 8B is another side and rear perspective view of the spacer shown in FIG. 8A.
Figure 8A:
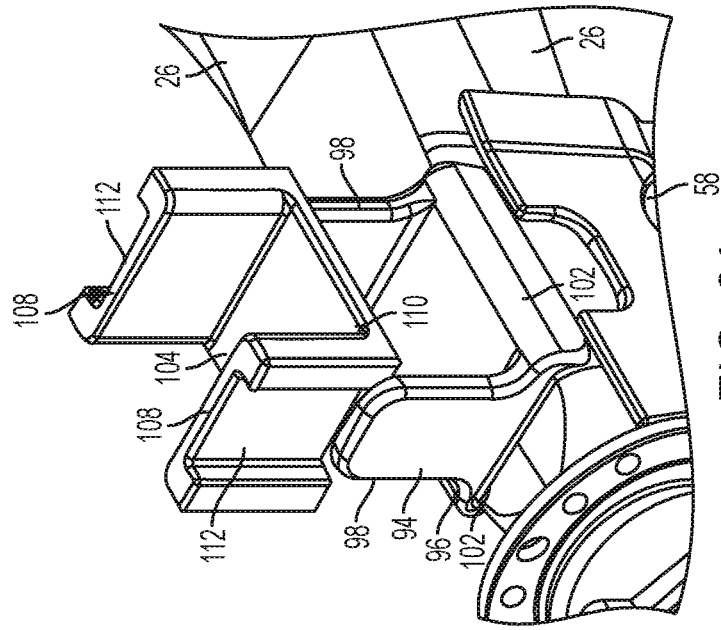
FIG. 8A is a side and rear perspective view of a spacer used in one or more of the present tandem suspension system.
Figure 8D:
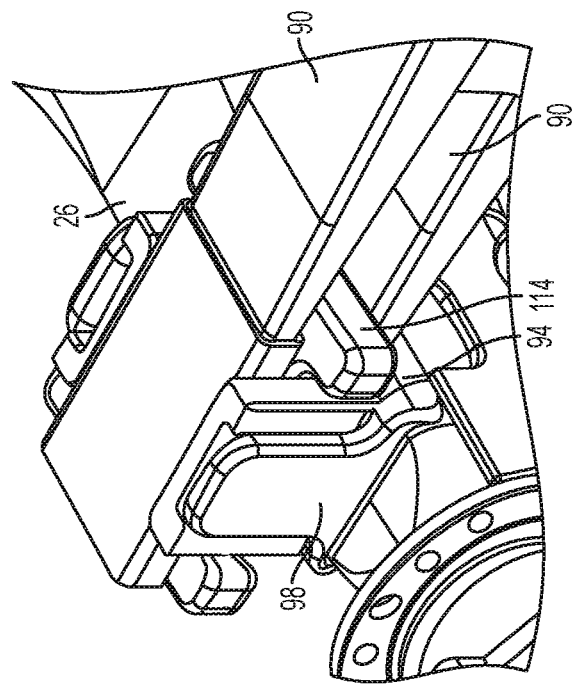
FIG. 8D is another side and rear perspective view of the spacer shown in FIG. 8A.
Figure 8C:
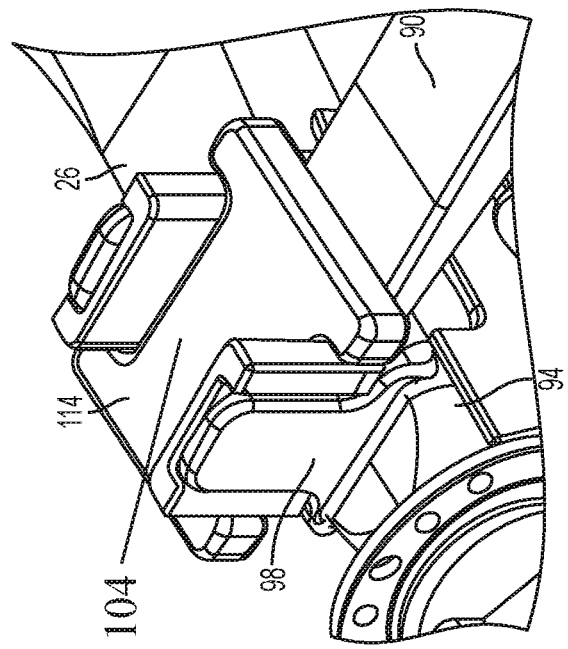
FIG. 8C is another side and rear perspective view of the spacer shown in FIG. 8A.
Figure 9:
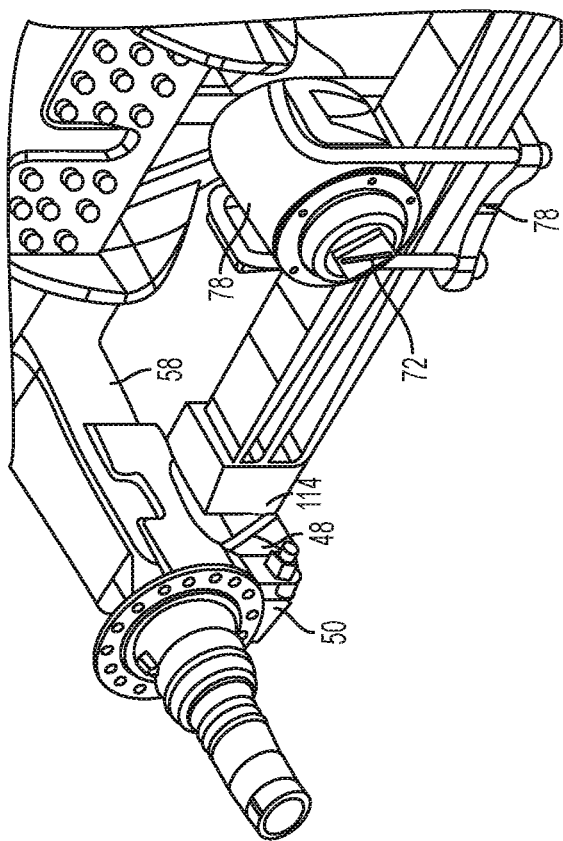
FIG. 9 is an enlarged view of a portion of FIG. 4A.
Figure 10:
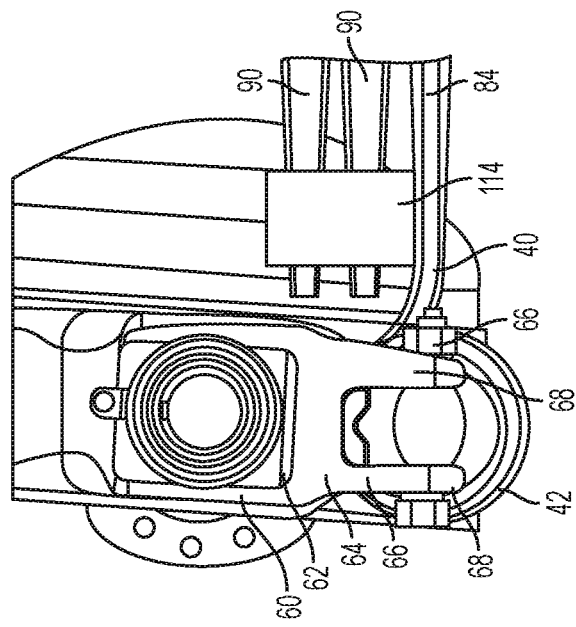
FIG. 10 is a side elevation view of the spacer shown in FIG. 9.
Figure 11:
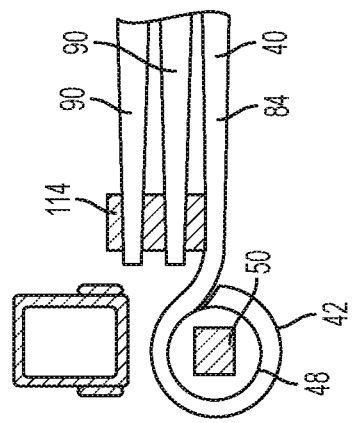
FIG. 11 is a side-cutaway view of the spacer and leaf springs from FIG. 10.

Turning to FIGS. 7A-7B, in this embodiment, only the rear ends 34, 36 of the upper eyeletted-leaf springs 40c, 40d include eyelets 42. The front ends 30, 32 of the upper eyeletted-leaf springs 40c, 40d do not form eyelets, but rather are planar—similar to the ends of the additional planar leaf springs 90 discussed above. As shown, while the rear ends 46a, 46b of the upper eyeletted-leaf springs 40c, 40d are associated with the brackets 116 discussed above with respect to FIGS. 6A-6B, the front ends 44a, 44b of the upper eyeletted-leaf springs 40c, 40d include the leaf spring mounts 94 discussed above with respect to FIGS. 8A-8D.

Figure 1B:
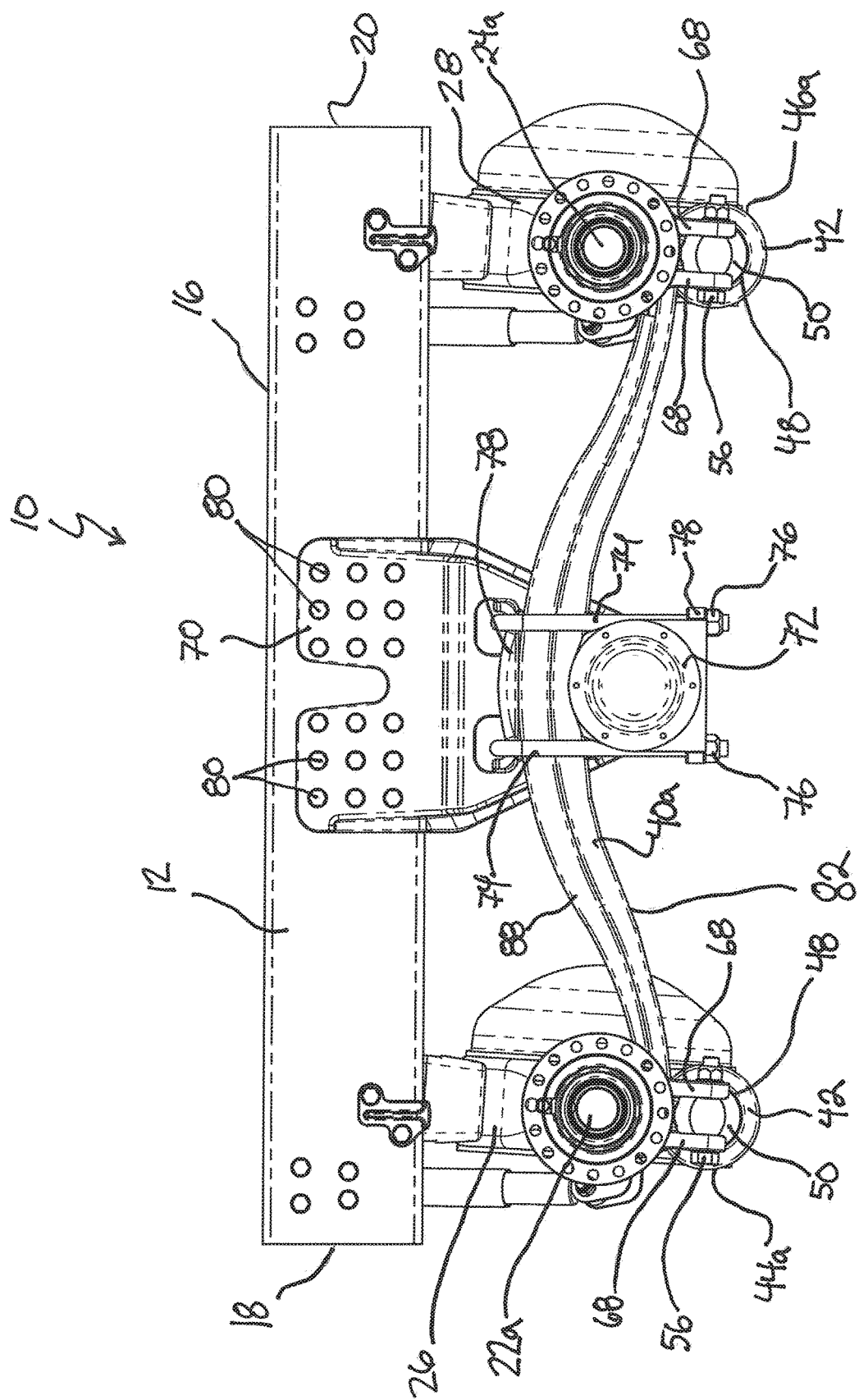
FIG. 1B is a side elevation view of the present tandem suspension system shown in FIG. 1A.

In the embodiments of both FIGS. 6A-6B and 7A-7B, the front axle assembly 26 is secured to the frame with a single rod 38 that is a longitudinal rod (as opposed to v-rods, see, e.g., FIGS. 1A-1B). Additionally, the tandem suspension assembly 10 in both FIGS. 6A-6B and 7A-7B includes one or more shock absorbers 126. The shock absorbers 126, at one end, are pivotably secured to the main members 12 of the frame 16 and, at the other end, are pivotably secured to one of the axle assemblies 26, 28, preferably at one of the ends 30, 32, 34, 36 of the axle assemblies 26, 28.

In the embodiments of both FIGS. 6A-6B and 7A-7B, the shock absorbers 126 will maintain the pinion angle for the front and rear axle assemblies 26, 28. Additionally, the pinion angle change is tunable to best fit a particular application. Additionally, only one rod 38 is needed to keep the axles from pivoting about the trunnion 72 during braking events. (Since the front moment arm is long as compared to the back, the rod 38 in the front keeps the entire assembly from rotating about the trunnion 72).

The different aspects of the different embodiments are believed to be combinable with any of the various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure, it being understood that various changes may be made in the function and arrangement of elements described in an exemplary embodiment without departing from the scope of the disclosure.

What is claimed is:

1. A tandem suspension system comprising:
   at least two axle assemblies being disposed parallel to each other, the at least two axle assemblies each including a first end and a second end;
   at least two eyeletted-leaf springs, each eyeletted-leaf spring having a first end and a second end, wherein at least one the first end and the second end of each eyeletted-leaf springs is curved to form an eyelet;
   a bushing disposed in each of the eyelets;
   a rotatable pin disposed in each bushing; and,
   a bracket attached to each end of each pin with a fastener having a longitudinal axis transverse to a longitudinal axis of pin,
   wherein each bracket comprises an upper portion with a U-shaped channel receiving one of the first or second ends of the at least two axle assemblies and a lower portion with a clevis portion having two arms, each arm receiving one of the fasteners.

2. The tandem suspension system of claim 1 wherein both the first end and the second end of each eyeletted-leaf spring is curved to form eyelets.

3. The tandem suspension system of claim 1 wherein the at least two eyeletted-leaf springs comprise camel back leaf springs.

4. The tandem suspension system of claim 1 wherein the at least two eyeletted-leaf springs comprise planar leaf springs.

5. The tandem suspension system of claim 1 wherein the at least two eyeletted-leaf springs comprise bent leaf springs.

6. The tandem suspension system of claim 1 further comprising:
   at least one additional leaf spring associated with each of the at least two eyeletted-leaf springs.

7. The tandem suspension system of claim 6 wherein the additional leaf springs are secured to ends of the two axle assemblies.

8. The tandem suspension system of claim 6 comprising two axle assemblies and two eyeletted-leaf springs, and wherein both ends of the two eyeletted-leaf springs are curved to form an eyelet.

9. The tandem suspension system of claim 8 wherein the two eyeletted-leaf springs are coupled to a trunnion secured to a frame.

10. A tandem suspension system comprising:
    a frame with two parallel main members,
    two trunnions, each parallel member coupled to a trunnion;
    two eyeletted-leaf springs, each eyeletted-leaf spring coupled to one of the two trunnions, and each eyeletted-leaf spring having a first end and a second end, wherein the first end and the second end of the two eyeletted-leaf springs are curved to form an eyelet;
    a rotatable pin disposed in each eyelet; and,
    two axle assemblies disposed parallel to each other, each axle assembly including a first end and a second end,
    wherein the first end of a first axle assembly is coupled to the first end of a first eyeletted-leaf spring and the second end of the first axle assembly is coupled to the first end of a second eyeletted-leaf spring, and
    wherein the first end of the second axle assembly is coupled to the second end of the first eyeletted-leaf spring and the second end of the second axle assembly is coupled to the second end of the second eyeletted-leaf spring,
    wherein each end of the eyeletted-leaf springs is coupled to a bracket, the brackets including a channel in an upper portion receiving one of the ends of the two axle assemblies,
    wherein each rotatable pin has two ends each coupled to an arm of a clevis in a lower portion of one of the brackets with a fastener, each fastener having a longitudinal axis transverse to a longitudinal axis of said pin.

11. The tandem suspension system of claim 10 further comprising:
    a bushing disposed within each eyelet between the rotatable pins and the eyeletted-leaf springs.

12. The tandem suspension system of claim 10 wherein the at least two eyeletted-leaf springs comprise camel back leaf springs.

13. The tandem suspension system of claim 10 wherein the at least two eyeletted-leaf springs comprise planar leaf springs.

14. The tandem suspension system of claim 10 wherein the at least two eyeletted-leaf springs comprise bent leaf springs.

15. The tandem suspension system of claim 10 further comprising:
    two additional leaf springs, each being associated with one of two eyeletted-leaf springs.

16. The tandem suspension system of claim 15 wherein the additional leaf springs are each coupled to one of the trunnions.

17. The tandem suspension system of claim 10 further comprising:
    a rod extending between and coupled to one of the axle assemblies and the frame.

18. The tandem suspension system of claim 10 further comprising:
    a pair of rods forming a V-shape extending between and coupled to the first axle assembly and the frame.

* * * * *